United States Patent [19]

Nishimura et al.

[11] 3,971,168

[45] July 27, 1976

[54] CONTROL APPARATUS FOR A MACHINE TOOL

[75] Inventors: Hideo Nishimura, Kariya; Ikuo Otsu, Toyota, both of Japan

[73] Assignee: Toyoda Koki Kabushiki Kaisha, Kariya, Japan

[22] Filed: Mar. 20, 1975

[21] Appl. No.: 560,365

[30] Foreign Application Priority Data
May 17, 1974 Japan.................................. 49-55198

[52] U.S. Cl.............................. 51/165.8; 51/165.87
[51] Int. Cl.²........................................ B24B 51/00
[58] Field of Search.......... 51/165 R, 165.71, 165.8, 51/165.87

[56] References Cited
UNITED STATES PATENTS

| | | | |
|---|---|---|---|
| 3,599,376 | 8/1971 | Renner............................... | 51/165.8 |
| 3,622,287 | 11/1971 | Nagoya............................... | 51/165.8 |
| 3,824,743 | 7/1974 | Price et al......................... | 51/165.71 |
| 3,828,477 | 8/1974 | Sanford............................. | 51/165.87 |

*Primary Examiner*—Harold D. Whitehead
*Attorney, Agent, or Firm*—Oblon, Fisher, Spivak, McClelland & Maier

[57] ABSTRACT

A control apparatus for a machine tool having a tool support for supporting a tool for machining a workpiece movable relative to the workpiece is disclosed. The control apparatus includes pulse generating means for generating a train of pulse signals, a drive motor for moving the tool support relative to the workpiece in response to the pulse signals, first means for causing the drive motor to be actuated to move the tool support away from the workpiece, detecting means actuated when the tool support is moved into an original position and second means responsive to the actuation of the detecting means for causing the drive motor to be actuated to move the tool support toward the workpiece. The control apparatus further includes counter means responsive to the second means for counting the number of the pulse signals supplied to the drive motor, setting means for digitally setting a distance between the original position and a start position, and comparing means for comparing the contents of the counter means and the setting means and for generating a coincidence signal when the contents coincide to thereby stop the movement of the tool support.

10 Claims, 1 Drawing Figure

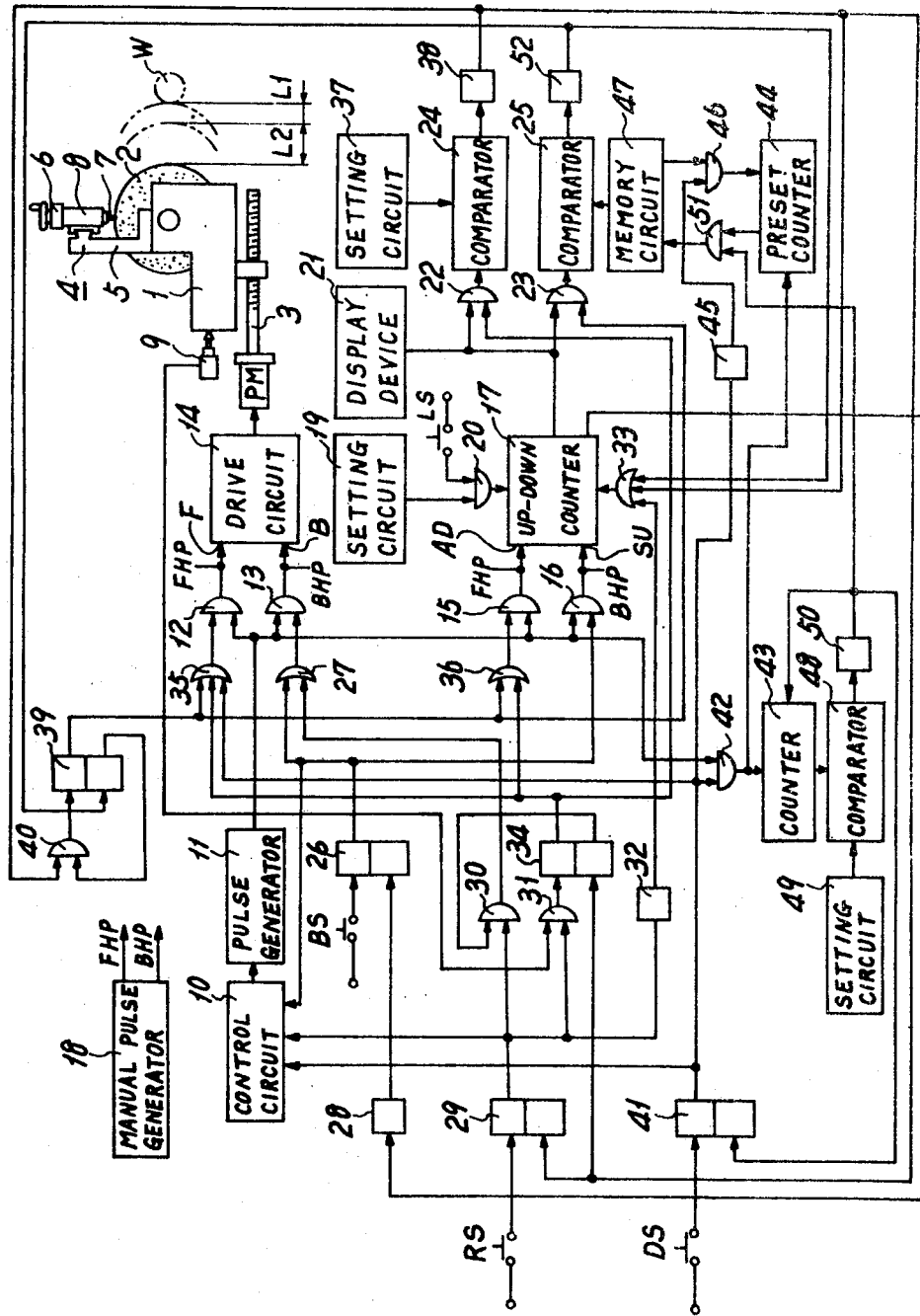

CONTROL APPARATUS FOR A MACHINE TOOL

BACKGROUND OF THE INVENTION

1. Field of the Invention:

The present invention relates to a control apparatus for a machine tool capable of positioning a tool support to a start position which can be arbitrarily set.

2. Description of the Prior Art:

In the past, the return of a movable member such as a wheel support in a grinding machine to an original position has been performed by using as a reference position an original position and by actuating by the wheel support an original position detecting device fixed to the bed of the grinding machine. There has been a disadvantage in that the distance between a workpiece and a grinding wheel on the wheel support retracted to the original position cannot be changed easily in accordance with the diameter of a workpiece to be grounded because the original position is fixed to the bed.

SUMMARY OF THE INVENTION

It is therefore an object of the present invention to provide a control apparatus for a machine tool capable of returning a tool support to a start position which can be arbitrarily set.

Another object of the present invention is to provide a control apparatus for a grinding machine capable of returning a wheel support to a start position which is compensated each time a dressing operation is performed on a grinding wheel.

The foregoing and other objects are attained in accordance with one aspect of the present invention, through the provision of control apparatus for a machine tool having a tool support supporting a tool for machining a workpiece and movable relative to said workpiece comprising:

pulse generating means for generating a train of pulse signals;

a drive motor for moving said tool support relative to said workpiece in response to said pulse signals;

first means for causing said drive motor to be actuated to move said tool support away from said workpiece;

detecting means actuated when said tool support is moved into an original position;

second means responsive to the actuation of said detecting means for causing said drive motor to be actuated to move said tool support toward said workpiece;

counter means responsive to said second means for counting the number of said pulse signals supplied to said drive motor;

setting means for digitally setting a distance between said original position and a start position; and comparing means for comparing the contents of said counter means and said setting means and for generating a coincidence signal when said contents coincide to stop the movement of said tool support.

BRIEF DESCRIPTION OF THE DRAWING

Various objects, features and attendant advantages of the present invention will be more fully appreciated as the same becomes better understood from the following detailed description of the present invention, when considered in connection with the accompanying drawing in which:

The FIGURE is a control circuit diagram according to the present invention.

DETAILED DESCRIPTION OF A PREFERRED EMBODIMENT

Referring now to the drawing, there is shown a wheel support 1 which is slidably mounted on a bed, not shown, and rotatably supports a grinding wheel 2 for grinding a workpiece W.

A stepping motor PM is mounted on the bed to move the wheel support 1 through a feed screw 3. The wheel support 1 is advanced toward the workpiece W when the stepping motor PM is rotated in a forward direction and is retracted from the workpiece W when the stepping motor PM is rotated in a reverse direction.

A wheel dressing device 4 is mounted on the wheel support 1 to dress the grinding wheel 2. The dressing device 4 comprises a bracket 5 on which a dressing head 8 is slidably mounted to be moved by a feed cylinder, not shown, in the direction of the width of the grinding wheel. The dressing head 8 carries a dressing tool 7 which can be fed by an intermittent feed unit 6 in a radial direction of the grinding wheel.

An original position detecting device 9 provided on the bed is adapted to be actuated when the wheel support 1 is positioned to an original position. The original position is defined by the detecting device 9 as a reference position of the wheel support 1 in returning the wheel support 1 to a start position on its feed stroke.

The start position is defined as a position from which the wheel support 1 is started towards the workpiece W to grind the same at various feed speeds in normal grinding cycles and as a position to which the wheel support 1 is retracted from a grinding position against the workpiece W through a distance L1 after the grinding operation is completed in order to permit a safe change of workpieces W.

An electrical circuit according to the present invention will now be described.

A control circuit 10 reads informations such as feed speed commands of the wheel support 1 and transmits signals responsive to the speed commands to a pulse generator 11 for generating a train of pulse signals. Outputs from the pulse generator 11 are fed to a terminal F for forward rotation and to a terminal B for reverse rotation of a stepping motor drive circuit 14 through AND circuits 12, 13 in order to rotate the stepping motor PM in either forward or reverse direction.

Outputs from the pulse generator 11 are also fed to a terminal AD for addition to a terminal SU for subtraction of an up-down counter 17 through AND circuits 15, 16.

A manually operated pulse generator 18 generates a train of pulse signals or outputs FHP for forward rotation of the stepping motor PM and BHP for reverse rotation thereof. The output FHP is fed to the terminal F of the stepping motor drive circuit 14 and to the terminal AD of the up-down counter 17. The output BHP is fed to the terminal B of the stepping motor drive circuit 14 and to the terminal SU of the up-down counter 17.

A setting circuit 19 comprising a digital switch is provided for digitally setting distance L1 of the wheel support 1. When a switch LS is depressed, an output of the setting circuit 19 is fed through an AND circuit 20 to a terminal of the up-down counter 17 for changing the content of the counter.

An output of the up-down counter 17 is fed to a display device 21 for indicating the content of the counter 17 and is fed to comparators 24, 25 through AND circuits 22, 23, respectively.

A flip flop circuit 26 is set for retraction of the wheel support 1 when a switch BS is depressed. An output from the set output terminal of the flip flop circuit 26 is fed to the control circuit 10 as a return command for returning the wheel support 1 from the grinding position against the workpiece W to the start position after the completion of the grinding operation. The output is also fed to the AND circuit 13 through an OR circuit 27 and to the AND circuit 16. The flip flop circuit 26 is reset by a signal supplied thereto through a pulse forming circuit 28 from the ZERO terminal of the up-down counter 17 when the content of the counter 17 becomes zero.

A flip flop circuit 29 is set for returning the wheel support 1 to the start position when a switch RS is depressed. An output from the set output terminal of the flip flop circuit 29 is fed to the control circuit 10 as a command for returning the wheel support 1 to the start position. An output is also fed to AND circuits 30, 31 and to the reset terminal of the up-down counter 17 through a pulse forming circuit 32 and an OR circuit 33.

An output of the original position detecting device 9 is fed through the AND circuit 31 to a flip flop circuit 34 to set the same. The reset output terminal of the flip flop circuit 34 is connected to the AND circuit 30. An output from the set output terminal of the flip flop circuit 34 is fed to the AND circuits 12, 15 through OR circuits 35, 36, respectively, and to the AND circuit 22.

A setting circuit 37 comprising a digital switch is provided for digitally setting a distance L2 between the original position of the wheel support 1 and the start position. The value set in the setting circuit 37 is compared by the comparator 24 with the content of the up-down counter 17. When the content of the up-down counter 17 coincides with the set value, the comparator 24 generates a coincidence signal which is fed through a pulse forming circuit 38 to the OR circuit 33 to clear the content of the counter 17 and to the flip flop circuits 29, 34 to reset the same. The coincidence signal is also fed through the pulse forming circuit 38 to a flip flop circuit 39 through an AND circuit 40 to set the same. A reset output terminal of the flip flop circuit 39 is connected to the AND circuit 40. An output from the set output terminal of the flip flop 39 is fed to the OR circuits 35, 36 and to the AND circuit 23.

A flip flop circuit 41 is set for the dressing of the grinding wheel when a switch DS is depressed. An output from the set output terminal of the flip flop circuit 41 is fed to the control circuit 10 as a command for compensating the position of the wheel support 1 and to an AND circuit 42 to transmit the output of the pulse generator 11 to an addition counter 43 and a preset counter 44. The output from the set ouptut terminal of the flip flop circuit 41 is also fed to the AND circuit 12 through the OR circuit 35 and to an AND circuit 46 through a pulse forming circuit 45 to thereby present into the preset counter 44 the memorized content of a memory circuit 47, such as a core memory, for memorizing a total amount of position compensation of the wheel support 1.

The content of the addition counter 43 is fed to a comparator 48 to be compared with a compensation amount of the wheel support position due to the dressing of the grinding wheel 2 which amount, corresponding to a dressing amount, is set in a setting circuit 49 comprising a digital switch. When the content of the addition counter 43 coincides with the compensation amount, a coincidence signal is generated from the comparator 48 which is fed through a pulse forming circuit 50 to the flip flop circuit 41 and the addition counter 43 for resetting the same to thereby complete the position compensation of the wheel support 1. The coincidence signal is also fed to an AND circuit 51 to thereby permit the memory circuit 47 to memorize the position compensation amount which has been accumulatively added in the preset chamber 44.

The content of the memory circuit 47 is compared by the comparator 25 with the content of the up-down counter 17. When both contents coincide, a coincidence signal is generated from the comparator 25 which is fed through a pulse forming circuit 52 to the OR circuit 33 to clear the content of the counter 17 and to the flip flop circuit 39 to reset the same.

The operation and the effect of the above described embodiment will now be described.

At first, the manually operated pulse generator 18 is operated to feed a train of pulse signals to the terminal F of the stepping motor drive circuit 14 to thereby advance the wheel support 1 toward a finish position where the workpiece W is ground to a predetermined finish size.

A diameter of the workpiece W being ground is measured by a sizing device, not shown. When the workpiece W is ground to the predetermined finish size, the operation of the manually operated pulse generator 18 is stopped to thereby stop the advance movement of the wheel support 1.

Thereafter, the moving amount L1 of the wheel support 1 in normal grinding cycles is digitally set in the setting circuit 19. When the switch LS is depressed, the set value or the moving amount L1 is supplied through the AND circuit 20 to the terminal of the up-down counter 17 for changing the content thereof. Therefore, the moving amount L1 is set in the up-down counter 17, taking the place of the moving amount of the wheel support used in the above described grinding operation, and the display device 21 displays the moving amount L1.

When the switch BS for returning the wheel support 1 is thereafter depressed to thereby set the flip flop circuit 26, a command to return the wheel support 1 is fed to the control circuit 10, the AND circuit 16 and to the AND circuit 13 through the OR circuit 27. Upon receiving the return command, the control circuit 10 supplies a wheel return speed signal to the pulse generator 11 so that the pulse generator 11 generates a train of pulse signals responsive to the wheel return speed signal to the terminal B of the stepping motor drive circuit 14 and the terminal SU of the up-down counter 17 through the AND circuits 13, 16, respectively. Thus, the wheel support 1 is retracted and the content of the up-down counter 17 is subtracted in response to each pulse signal.

When the wheel support 1 is retracted by the moving distance L1 from the finish position, the content of the up-down counter 17 becomes zero and the display device 21 indicates zero. An output from the zero terminal of the up-down counter 17 is fed through the pulse forming circuit 28 to the flip flop circuit 26 to reset the same so that the supply of pulse signals to the terminal B of the stepping motor drive circuit 14 and to the terminal SU of the up-down counter 17 is stopped to thereby stop the wheel support 1 at the start position.

The manually operated pulse generator 18 is subsequently operated to retract the wheel support 1 from the start position to the original position where the original position detecting device 9 is actuated. During the retracted movement of the wheel support 1, a train of pulse signals BHP for reverse rotation of the stepping motor PM is fed to the up-down counter 17. When the wheel support 1 is retracted to the original position, the distance L2 between the start position and the original position is displayed on the display device 21.

Therefore, when the distance L2 is set in the setting circuit 37 and the switch RS is depressed to set the flip flop circuits 29, the output from the set output terminal of the flip flop circuit 29 is fed to the control circuit 10, the AND circuits 30, 31 and to the pulse forming circuit 32. The output from the pulse forming circuit 32 is fed through the OR circuit 33 to the up-down counter to reset the same so that the display device 21 indicates zero. Since the original position detecting device is being actuated, the output supplied from the flip flop circuit 29 to the AND circuit 31 causes the flip flop circuit 34 to be set to thereby close the AND circuit 30. The output from the set output terminal of the flip flop circuit 34 is fed to the AND circuits 12, 15 through the OR circuits 35, 36, respectively, and to the AND circuit 22.

Upon receiving the output of the flip flop 29, the control circuit 10 supplies a speed signal to the pulse generator 11 so that the pulse generator 11 generates a train of pulse signals responsive to the speed signal to the terminal F of the stepping motor circuit 14 and the terminal AD of the up-down counter 17 through the AND circuits 12, 15, respectively.

Thus, the stepping motor PM is rotated in a forward direction to advance the wheel support 1 and the content of the up-down counter 17 is added in response to each pulse signal and is indicated on the display device 17. The content of the up-down counter 17 is fed through the AND circuit 22 to the comparator 24 to be compared with the distance L2 set in the setting circuit 37.

When the wheel support 1 is advanced by the distance L2, a coincidence signal is generated from the comparator 24 which is fed through the pulse forming circuit 38 to the flip flop circuits 29, 34 and to the up-down counter 17 through the OR circuit 33 to reset the same. The coincidence signal is also fed through the AND circuit 40 to the flip flop circuit 39 to set the same.

The output from the set output terminal of the flip flop circuit 39 is fed to the AND circuits 12, 15 through the OR circuits 35, 36, respectively, and is also fed to the AND circuit 23 so that the content of the reset up-down counter 17 is compared by the comparator 25 with the content of the memory circuit 47. When the content of the memory circuit 47 is zero or reset due to, for example, the exchange of the grinding wheel 2 and the change of the grinding stroke L1, a coincidence signal is generated from the comparator 25 which is fed through the pulse forming circuit 52 to the flip flop circuit 39 to reset the same. Therefore, the wheel support 1 is positioned at the start position after advancing by the setting distance L2 set in the setting circuit 37.

Subsequently, the wheel support 1 repeats the movement of the distance L1 to grind a plurality of workpieces W under the control, for example, of the sizing device.

When the cutting ability of the grinding wheel 2 is decreased, the switch DS is depressed to supply a dressing command to the control circuit 10 so that the dressing device 4 is actuated to dress the grinding wheel 2 by a dressing amount. For compensation of the wheel support position due to the dressing, the flip flop circuit 41 is set by the depression of the switch DS so that a position compensation command is fed to the control circuit 10, the AND circuit 42 and to the AND circuit 12 through the OR circuit 35.

The position compensation command is also fed to the AND circuit 46 through the pulse forming circuit 45 so that the content of the memory circuit 47 is preset through the AND circuit 46 in the preset counter 44.

Upon receiving the position compensation command, the control circuit 10 supplies a speed signal for position compensation to the pulse generator 11. A train of pulse signals generated from the pulse generator 11 in response to the speed signal is fed to the terminal F of the stepping motor drive circuit 14 through the AND circuit 12 to thereby advance the wheel support 1 and fed through the AND circuit 42 to the addition counter 43 and the preset counter 44 to thereby increase the contents thereof.

When the content of the addition counter 43 coincides with the content of the setting circuit 49, the comparator 48 generates a coincidence signal which is fed through the pulse forming circuit 50 to the flip flop circuit 41 and the addition counter 43 to reset the same to thereby stop the feed movement of the position compensation of the wheel support 1. The coincidence signal is also fed to the AND circuit 51 so that the content of the preset counter 44 in which the amount of the position compensation for the wheel support 1 has been added is memorized in the memory circuit 47.

Therefore, the wheel support 1 is moved through the compensation amount equal to the dressing amount of the dressing tool 7 by the intermittent feed unit 6 to thereby keep the moving amount L1 constant and a total amount of the position compensation is memorized in the memory circuit 47. The same operation as mentioned above will be repeated each time a dressing operation is performed on the grinding wheel 2. Accordingly, it is possible to keep constant the grinding accuracy of a grinding machine wherein the grinding operation is not controlled by a sizing device and to grind various workpieces W with different sizes at constant grinding cycles.

If it is necessary to return the wheel support 1 from an intermediate position to the start position because the electric current is cut off or an emergency stop is performed, the switch RS is depressed to set the flip flop circuit 29. With the flip flop circuit 29 being set, the up-down counter 17 is reset and the pulse generator 11 generates a train of pulse signals at a return speed, similarly to the above description. The return command from the flip flop circuit 29 is also fed from the AND circuit 30 receiving the reset output from the flip flop circuit 34 to the AND circuit 13 through the OR circuit 27 so that the pulse signals are fed to the terminal B of the stepping motor drive circuit 14 to thereby retract the wheel support 1.

When the wheel support 1 is retracted to the original position, the position detecting device 9 is actuated and the output thereof is fed to the AND circuit 31 so that the above-mentioned return command is fed through the AND circuit 31 to the flip flop circuit 34 to thereby set the same. With the flip flop circuit 34 being set, the return command fed from the AND circuit 30 through the OR circuit 27 to the AND circuit 13 is stopped.

The output from the set output terminal of the flip flop circuit 34 is fed to the AND circuits 12, 15 through the OR circuits 35, 36 respectively, and to the AND circuit 22 so that a train of pulse signals from the pulse generator 11 is fed to the terminal F of the stepping motor drive circuit 14 to advance the wheel support from the original position and to increase the content of the up-down counter 17 in response to each pulse signal. The advanced amount of the wheel support 1 is indicated on the display device 21.

Subsequently, when the wheel support 1 is advanced by the distance L2 set in the setting circuit 37, a coincidence signal is generated from the comparator 24 which is fed through the pulse forming circuit 38 to the flip flop circuits 29, 34 and to the up-down counter 17 to reset the same. The coincidence signal is also fed to the flip flop circuit 39 through the AND circuit 40 to set the same. The output from the set output terminal of the flip flop circuit 39 is fed to the AND circuits 12, 15 through the OR circuits 35, 36 respectively and to the AND circuit 23 so that the train of pulse signals from the pulse generator 11 is continuously fed to the terminal F of the stepping motor drive circuit 14 and to the terminal AD of the up-down counter 17. Therefore, the wheel support 1 is advanced until the content of the up-down counter 17 coincides with the memorized content of the memory circuit 47.

When the wheel support 1 is advanced through the memorized content of the memory circuit 47, that is, a total position compensation amount due to the dressing of the grinding wheel 2, a coincidence signal is generated from the comparator 25 which is fed through the pulse forming circuit 52 to the flip flop circuit 39 and the up-down counter 17 to reset the same. Therefore, a pulse generation to the stepping motor drive circuit 14 is stopped so that the wheel support 1 stopped by the interruption of electric current or the emergency stop may be accurately positioned at the start position.

Obviously, numerous modifications and variations of the present invention are possible in light of the above teachings. It is therefore to be understood that within the scope of the teaching herein and the appended claims the invention may be practiced otherwise than as specifically described herein.

What is claimed as new and desired to be secured by Letters Patent of the United States is:

1. Control apparatus for a machine tool having a tool support supporting a tool for machining a workpiece and movable relative to said workpiece comprising:
    a pulse generating means for generating a train of pulse signals;
    a drive motor operatively connected to said tool support for moving said tool support relative to said workpiece in response to said pulse signals;
    first means including a manually operated switch for causing said drive motor to be actuated to move said tool support away from said workpiece toward an original position;
    detecting means actuated when said tool support is moved into the original position;
    second means responsive to the actuation of said detecting means for causing said drive motor to be actuated to move said tool support toward said workpiece;
    counter means responsive to said second means for counting the number of said pulse signals supplied to said drive motor;
    setting means for digitally setting a distance between said original position and a start position; and
    comparing means operatively connected to said counter means and said setting means for comparing the contents of said counter means and said setting means and for generating a coincidence signal when said contents coincide to stop the movement of said tool support to thereby position said tool support at the start position.

2. Control apparatus as claimed in claim 1 further comprising display means connected to said counter means for indicating the content of said counter means.

3. Control apparatus for a grinding machine having a wheel support supporting a grinding wheel for grinding a workpiece and movable relative to said workpiece comprising:
    pulse generating means for generating a train of pulse signals;
    a drive motor operatively connected to said wheel support for moving said wheel support relative to said workpiece in response to said pulse signals;
    first means including a manually operated switch for causing said drive motor to be actuated to move said wheel support away from said workpiece toward an original position;
    detecting means actuated when said wheel support is moved into the original position;
    second means responsive to the actuation of said detecting means for causing said drive motor to be actuated to move said wheel support toward said workpiece;
    counter means responsive to said second means for counting the number of said pulse signals supplied to said drive motor;
    setting means for digitally setting a distance between said original position and a start position;
    first comparing means operatively connected to said counter means and said setting means for comparing the contents of said counter means and said setting means and for generating a coincidence signal when said contents coincide;
    the content of said counter means being cleared in response to said coincidence signal;
    third means responsive to said coincidence signal for causing said drive motor to be actuated to further move said wheel support toward said workpiece;
    said counter means being responsive to said third means for counting the number of said pulse signals supplied to said drive motor;
    memory means for accumulatively memorizing a compensation amount corresponding to a dressing amount; and
    second comparing means responsive to said third means for comparing the contents of said counter means and said memory means and for generating a coincidence signal when the contents coincide to stop the movement of said wheel support.

4. Control apparatus as claimed in claim 3, further comprising display means connected to said counter means for indicating the content of said counter means.

5. Control apparstus as claimed in claim 3, further comprising:
   fourth means for causing said drive motor to be actuated to move said wheel support for compensation thereof each time a dressing operation is performed on said grinding wheel;
   second counter means responsive to said fourth means for counting the number of said pulse signals supplied to said drive motor;
   second setting means for digitally setting a compensation amount corresponding to one dressing amount;
   third comparing means for comparing the contents of said second counter means and said second setting means and for generating a coincidence signal when the contents coincide;
   preset counter means responsive to said fourth means for receiving the content of said memory means and for receiving the pulse signals supplied to said drive motor;
   said memory means being responsive to said coincidence signal of said third comparing means to receive the content of said preset counter means;
   the content of said second counter means being cleared in response to said coincidence signal of said third comparing means.

6. Control apparatus for a machine tool having a tool support supporting a tool for machining a workpiece and movable relative to said workpiece comprising:
   manually operated pulse generating means for generating a train of pulse signals;
   pulse generating means for generating a train of pulse signals;
   a drive motor operatively connected to said tool support for moving said tool support relative to said workpiece in response to said pulse signals;
   said manually operated pulse generating means being operable to cause said drive motor to be actuated to move said tool support to a finish position where said workpiece is machined to a finish size;
   first setting means for digitally setting a distance between said finish position and a start position;
   counter means for counting the number of said pulse signals supplied to said drive motor;
   first means including a first manually operated switch for setting the distance set in said first setting means into said counter means;
   second means including a second manually operated switch for causing said drive motor to be actuated by said pulse generating means to retract said tool support from said finish position and for causing said counter means to subtract the content thereof in response to said pulse signals supplied to said drive motor;
   said counter means being operable to stop the movement of said tool support when the content thereof becomes zero such that said tool support is moved from said finish position to said start position;
   said manually operated pulse generating means being operable to move said tool support from said start position to an original position;
   detecting means actuated when said tool support is moved into said original position;
   second setting means for digitally setting a distance between said original and start positions;
   third means including a third manually operated switch for causing said drive motor to be actuated by said pulse generating means to move said tool support from said original position to said start position;
   said counter means being responsive to said thrird means for counting the number of said pulse signals supplied from said pulse generating means to said drive motor;
   comparing means for comparing the contents of said counter means and said second setting means and for generating a coincidence signal when said contents coincide to stop the movement of said tool support to thereby position said tool support to the start position.

7. Control apparatus as claimed in claim 6, further comprising display means connected to said counter means for indicating the content of said counter means.

8. Control apparatus for a grinding machine having a wheel support supporting a grinding wheel for grinding a workpiece and movable relative to said workpiece comprising:
   manually operated pulse generating means for generating a train of pulse signals;
   pulse generating means for generating a train of pulse signals;
   a drive motor operatively connected to said wheel support for moving said wheel support relative to said workpiece in response to said pulse signals;
   said manually operated pulse generating means being operable to cause said drive motor to be actuated to move said wheel support to a finish position where said workpiece is ground to a finish size;
   first setting means for digitally setting a distance between said finish position and a start position;
   counter means for counting the number of said pulse signals supplied to said drive motor;
   first means including a first manually operated switch for setting the distance set in said first setting means into said counter means;
   second means including a second manually operated switch for causing said drive motor to be actuated by said pulse generating means to retract said wheel support from said finish position and for causing said counter means to subtract the content thereof in response to said pulse signals supplied to said drive motor;
   said counter means being operable to stop the movement of said wheel support when the content thereof becomes zero such that said wheel support is moved from said finish position to said start position;
   said manually operated pulse generating means being operable to move said wheel support from said start position to an original position;
   detecting means actuated when said wheel support is moved into said original position;
   second setting means for digitally setting a distance between said original and start positions;
   third means including a third manually operated switch for causing said drive motor to be actuated by said pulse generating means to move said wheel support from said original position to said start position;
   said counter means being responsive to said third means for counting the number of said pulse signals supplied from said pulse generating means to said drive motor;

first comparing means for comparing the contents of said counter means and said second setting means and for generating a coincidence signal when said contents coincide;

the content of said counter means being cleared in response to said coincidence signal;

fourth means responsive to said coincidence signal for causing said drive motor to be actuated by said pulse generating means to further move said wheel support toward said workpiece;

said counter means being responsive to said fourth means for counting the number of said pulse signals supplied from said pulse generating means to said drive motor;

memory means for accumulatively memorizing a compensation amount corresponding to a dressing amount; and second comparing means responsive to said fourth means for comparing the contents of said counter means and said memory means and for generating a coincidence signal when the contents coincide to stop the movement of said wheel support.

9. Control apparatus as claimed in claim 8 further comprising display means connected to said counter means for indicating the content of said counter means.

10. Control apparatus as claimed in claim 8, further comprising:

fifth means for causing said drive motor to be actuated to move said wheel support for compensation thereof each time a dressing operation is performed on said grinding wheel;

second counter means responsive to said fifth means for counting the number of said pulse signals supplied from said pulse generating means to said drive motor;

third setting means for digitally setting a compensation amount corresponding to one dressing amount;

third comparing means for comparing the contents of said second counter means and said third setting means and for generating a coincidence signal when the contents coincide;

preset counter means responsive to said fifth means for receiving the content of said memory means and for receiving the pulse signals supplied from said pulse generating means to said drive motor;

said memory means being responsive to said coincidence signal of said third comparing means to receive the content of said preset counter means;

the content of said second counter means being cleared in response to said coincidence signal of said third comparing means.

* * * * *